Oct. 6, 1936.  M. P. BLOMBERG  2,056,229
ENGINE BED FOR RAILWAY CARS
Filed Aug. 17, 1934   6 Sheets-Sheet 1
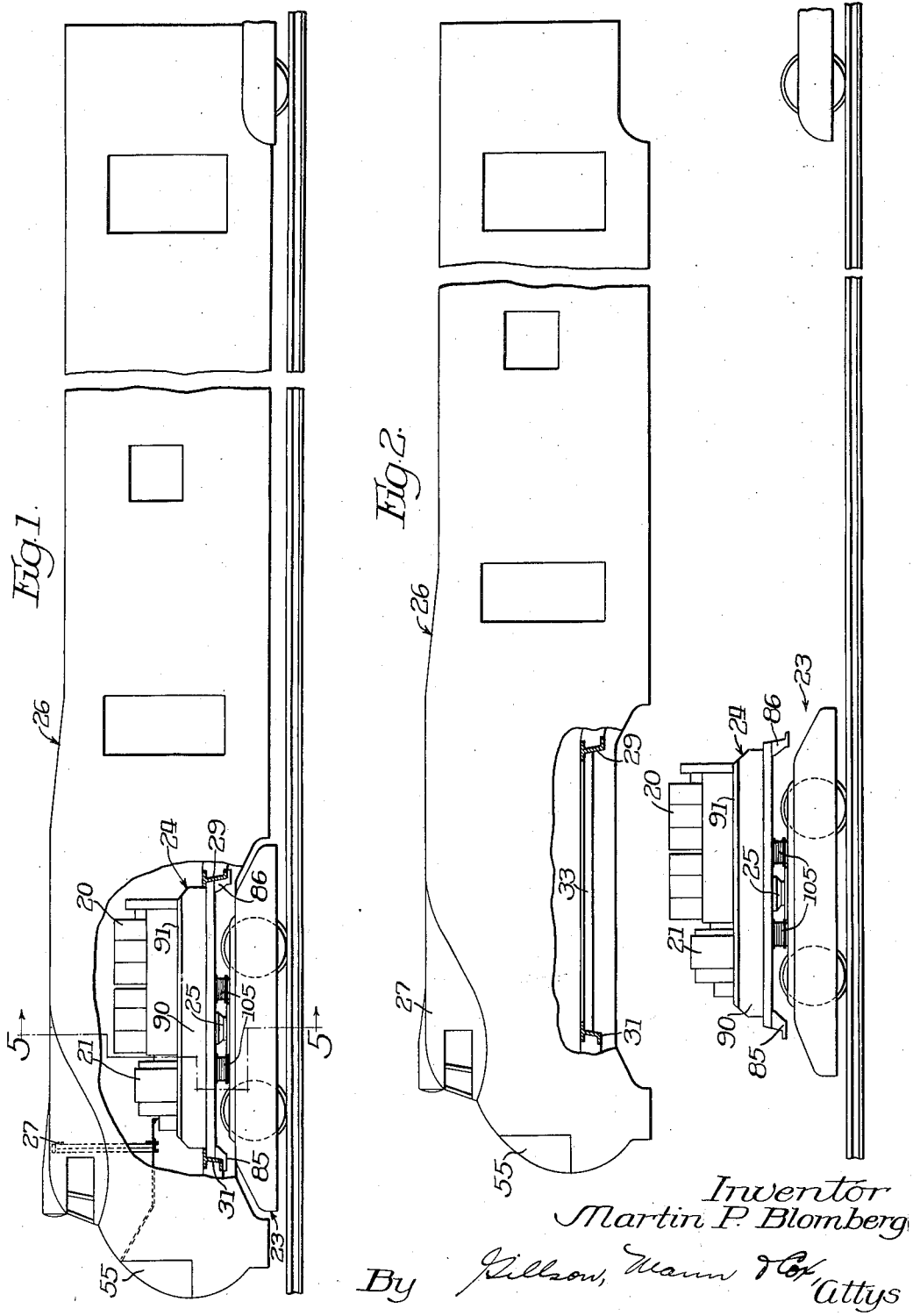

Oct. 6, 1936.   M. P. BLOMBERG   2,056,229
ENGINE BED FOR RAILWAY CARS
Filed Aug. 17, 1934   6 Sheets-Sheet 2

Inventor
Martin P. Blomberg.
By Gillson, Mann & Cox, Attys

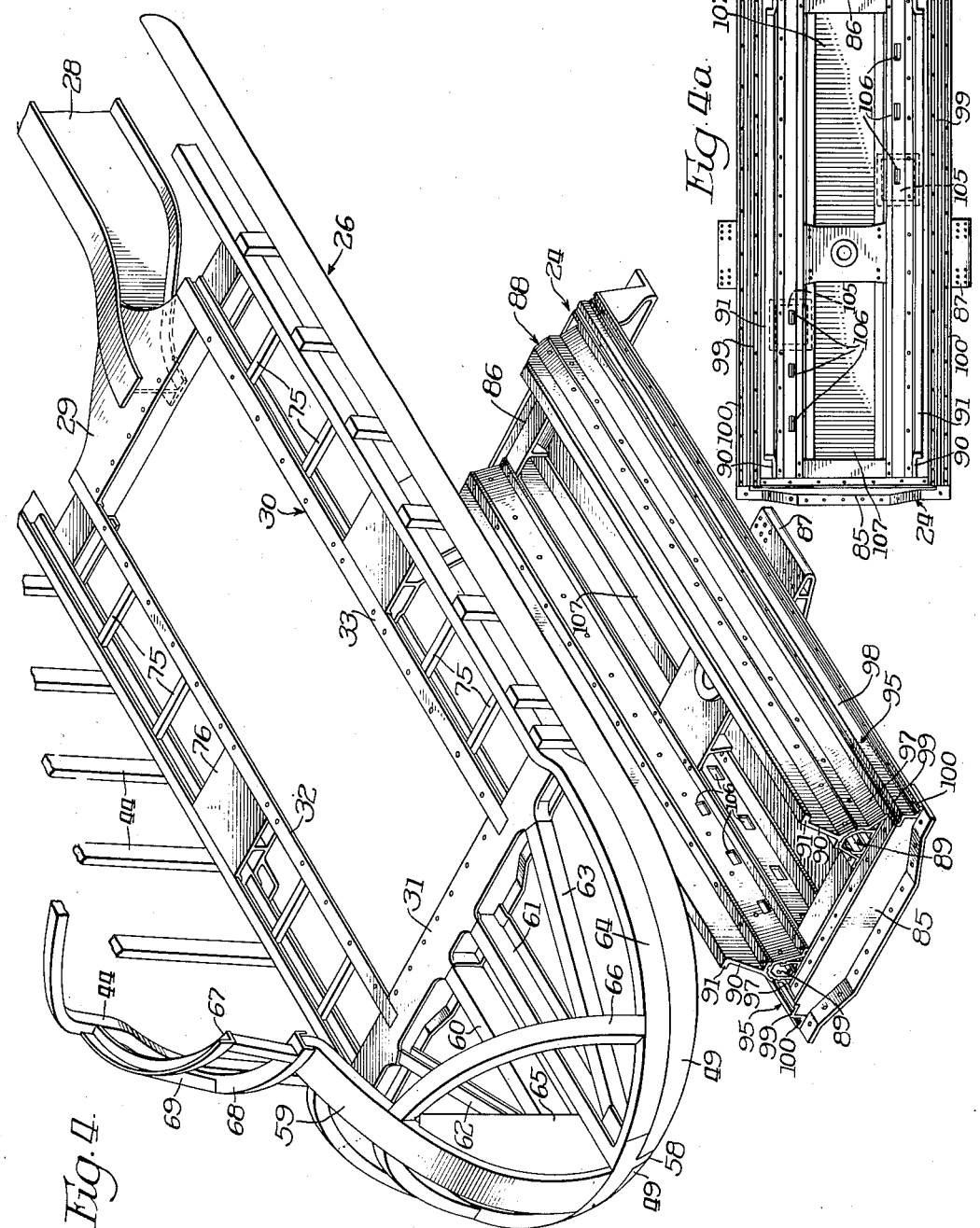

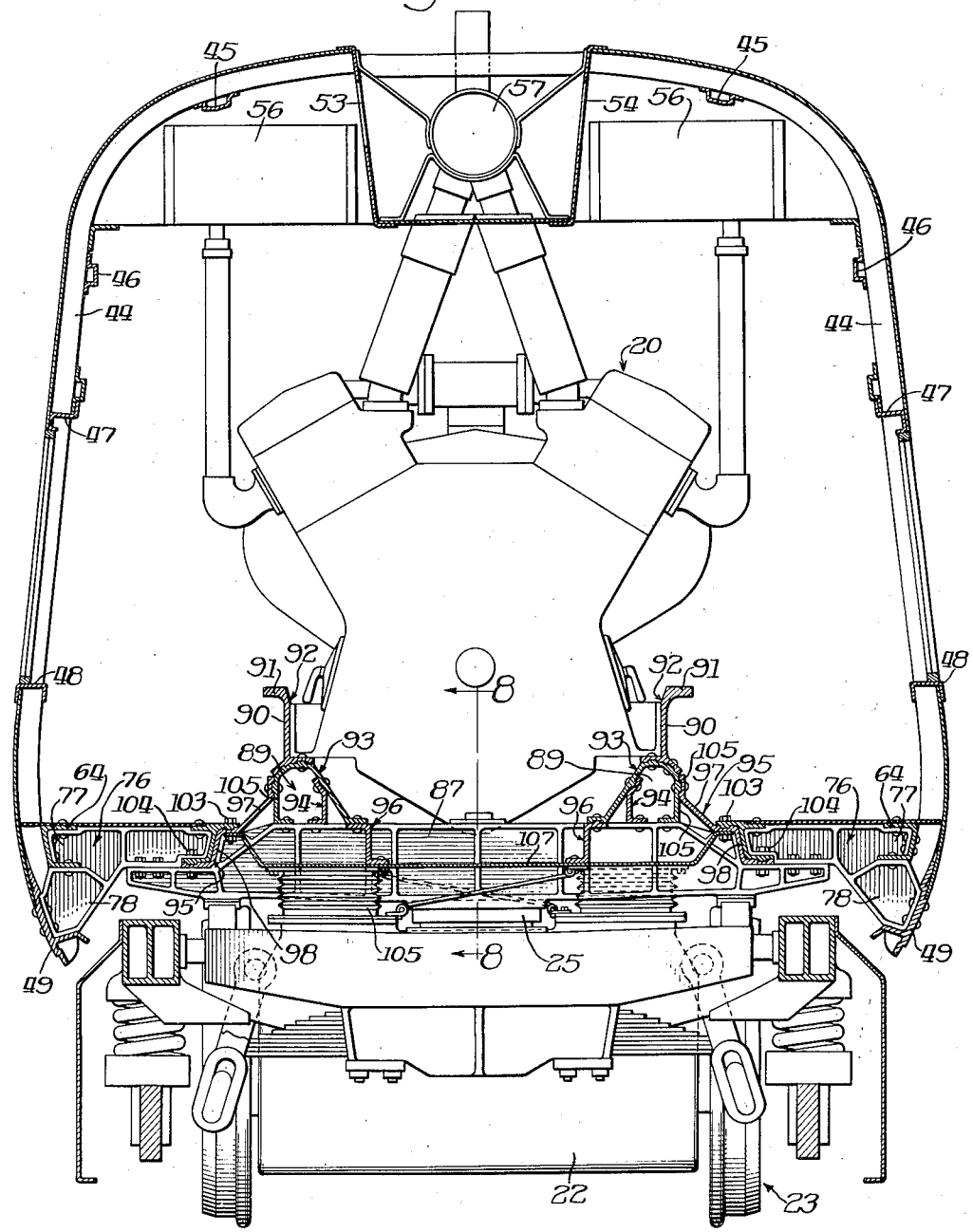

Oct. 6, 1936.  M. P. BLOMBERG  2,056,229
ENGINE BED FOR RAILWAY CARS
Filed Aug. 17, 1934    6 Sheets-Sheet 5
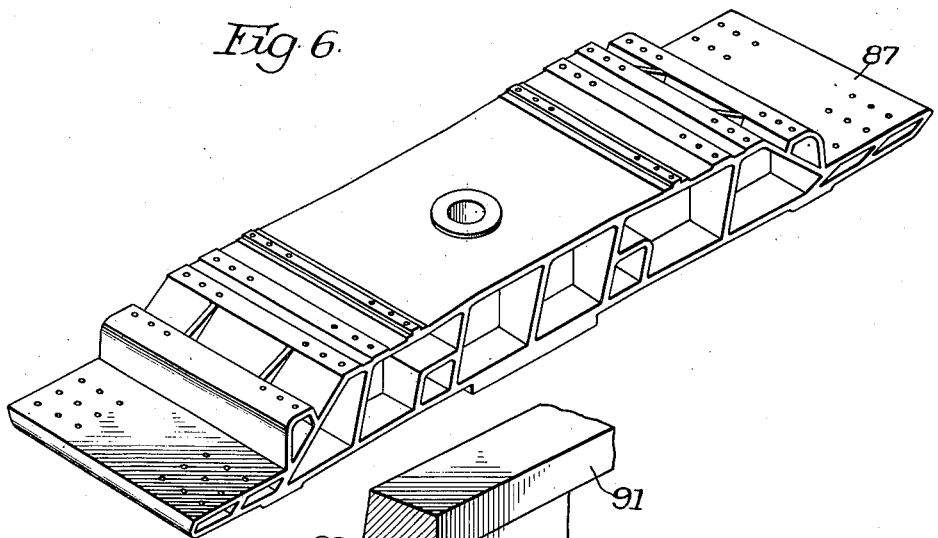
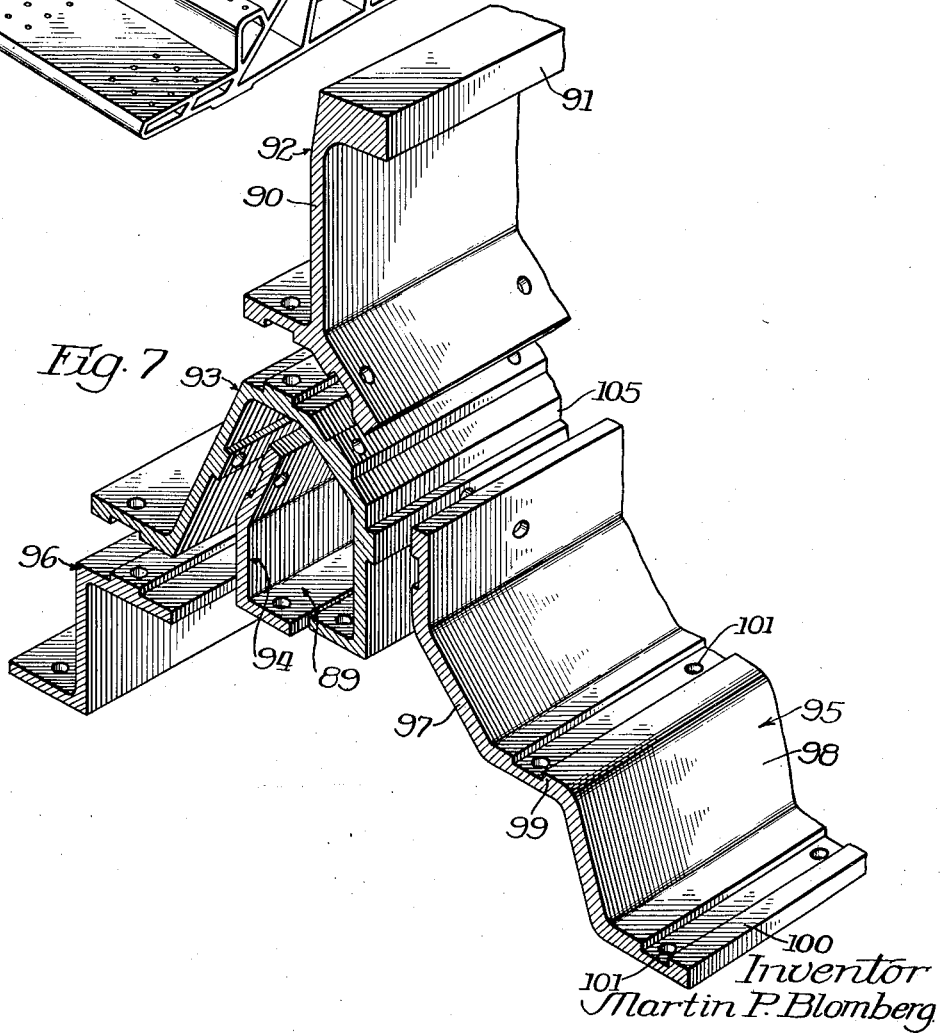
Inventor
Martin P. Blomberg
By Killson, Mann & Cox,
Attys.

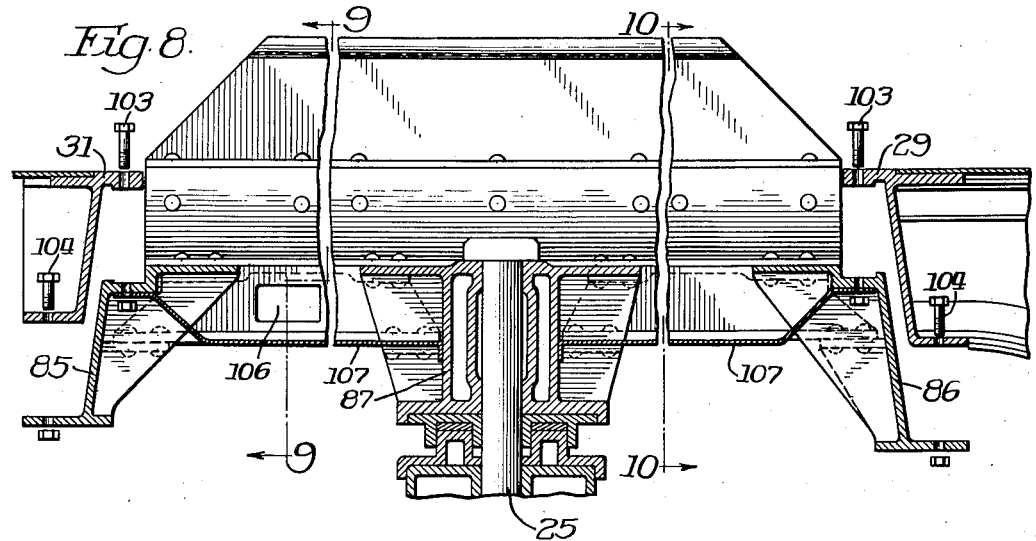
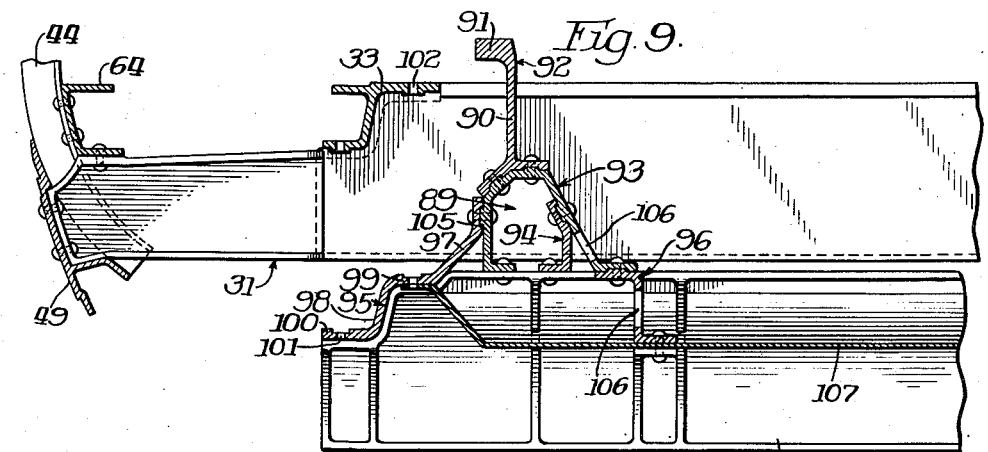
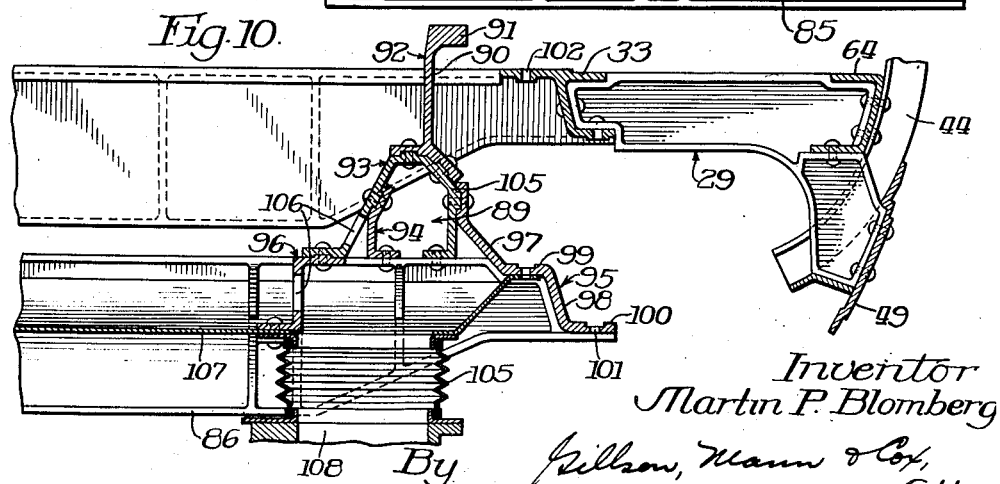

Patented Oct. 6, 1936

2,056,229

UNITED STATES PATENT OFFICE 2,056,229

ENGINE BED FOR RAILWAY CARS

Martin P. Blomberg, Chicago, Ill., assignor to Pullman-Standard Car Manufacturing Company, Chicago, Ill., a corporation of Delaware Application August 17, 1934, Serial No. 740,338

9 Claims. (Cl. 105—35)

This invention relates to rail cars propelled by internal combustion engines, and the principal object of the invention is to provide a lightweight engine bed that is capable of withstanding the various kinds of load to which it is subjected, including the static load of the car body and the engine, live loads produced by rapid changes in the cylinder pressures and by the car travelling over rail joints; and longitudinal stresses caused by collision.

Further and other objects and advantages will become apparent as the disclosure proceeds, and the description is read in conjunction with the accompanying drawings, in which:

Fig. 1 is a diagrammatic, side elevational view of a rail car made in accordance with this invention, a portion of the car side being broken away to show the mounting of the engine on the forward truck;

Fig. 2 illustrates the manner in which the power unit may be detached from the car body;

Fig. 4 is an enlarged, diagrammatic perspective view of the box framework which receives the engine bed, the latter being shown in detached relation to the car body;

Figure 3:
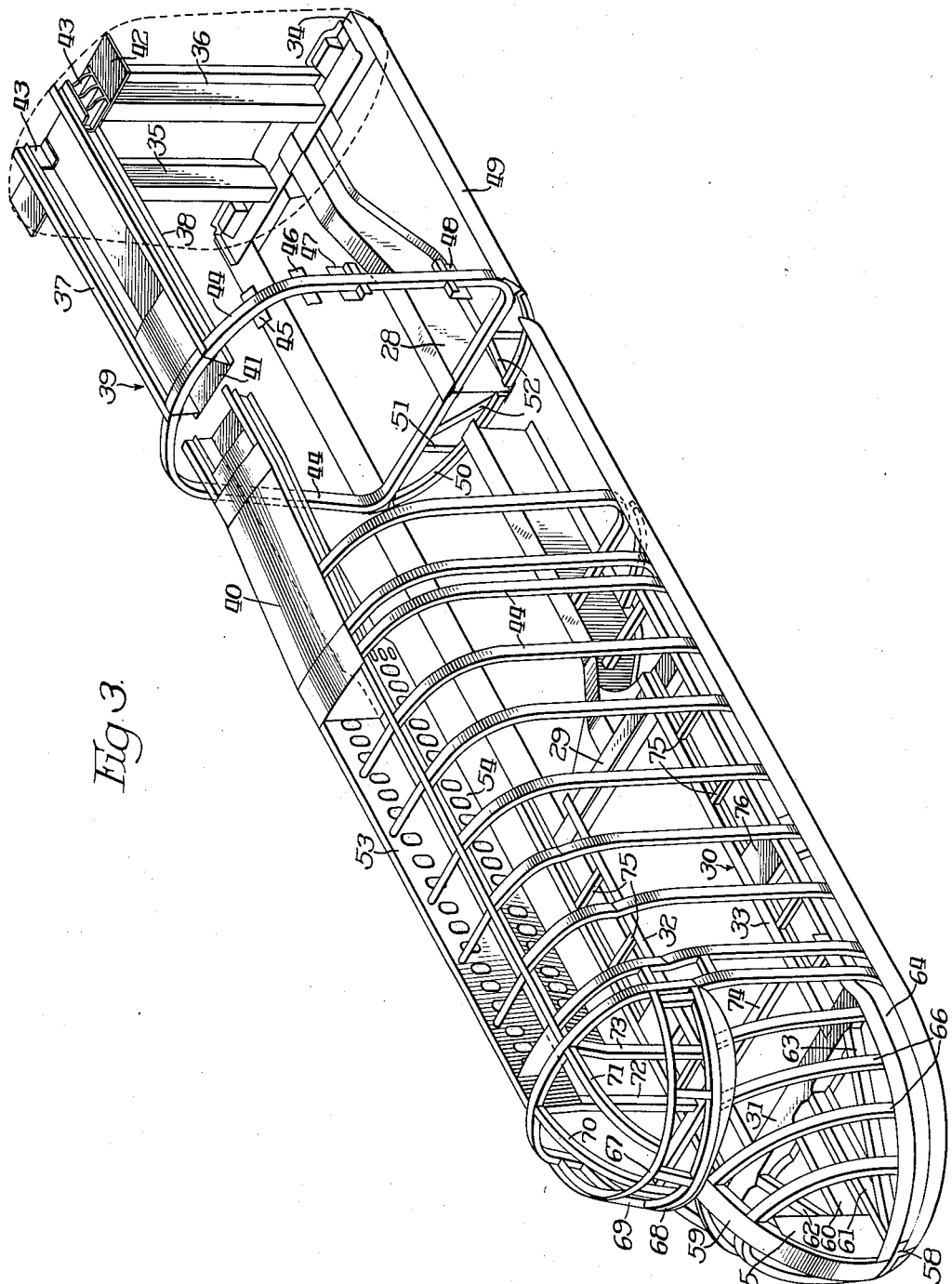
Fig. 3 is a diagrammatic, perspective view of the body framework.

Fig. 4-a is a plan view of the engine bed;

Fig. 5 is a vertical cross section through the car, the section being taken on the line 5—5 of Fig. 1 and the internal combustion engine being shown in elevation;

Fig. 6 is a perspective view of the intermediate cross piece or bolster which connects the side framing members of the engine bed;

Fig. 7 is an enlarged, perspective view of the component parts of the engine bed side frame, the parts being shown slightly spaced from one another for clarity of illustration;

Fig. 8 is a detail, sectional view taken on the line 8—8 of Fig. 5;

Figs. 9 and 10 are fragmentary, sectional views taken on the lines 9—9 and 10—10, respectively, of Fig. 8.

The specific embodiment of the invention shown in the drawings and hereinafter described has been chosen for the purpose of illustration and disclosure, but the scope of the invention should be gauged by the appended claims, construed as broadly as the prior art will permit.

The invention has been shown applied to a high speed, multi-section rail car of stream-line form, the leading or motor section being the only one illustrated in the drawings.

The car is propelled by an internal combustion engine, generally designated 20, driving a generator 21 which supplies current to traction motors 22 mounted on the forward truck, generally designated 23. The engine 20 and generator 21 are supported on an engine bed, generally designated 24, which is swivelled on the car truck 23 by a center bearing 25. The engine bed is detachable from the car body, generally designated 26, so that when there is occasion for repairing the power equipment of the car, the entire power unit including the internal combustion engine, the generator, and the traction motors, may be quickly removed from the car by lifting the car body from the leading truck 23, as shown in Fig. 2, or by dropping the truck into a pit after jacking up the forward end of the car body.

Contrary to the established practice with steam locomotives, the control cab is at the front, as indicated at 27, and it becomes necessary to provide suitable protection for the personnel in the cab in the event of collision. This is accomplished in the present invention by making use of the inertia of the power unit and by constructing the nose framework accordingly.

Referring now to Fig. 3, it will be seen that the body framework of the leading section comprises a center sill 28 connected at the front to the rear cross tie 29 of a box frame, generally designated 30, the frame also including a front cross tie 31, and longitudinal stringers 32 and 33. The rear end of the center sill joins with an end sill 34 from which a pair of door end posts 35 and 36 rise for supporting top sills 37 and 38, the latter constituting the side members of a box girder, generally designated 39, which also includes a top stress plate 40 and a bottom stress plate 41. The girder rests upon a top anti-telescoping plate 42 and is secured to the door end posts and top plate 42 by brackets 43.

The box girder 39 and center sill 28 are joined at intervals by curved ribs 44 which extend from the top sills 38 and 39 to the upper portion of the center sill. A plurality of longitudinal framing members connect the ribs interiorly, the members including a roof stringer 45, a deck stringer 46, a window header stringer 47, a belt rail 48, a side sill 49, and various longitudinal floor stringers, none of which are shown.

Inasmuch as a smooth surface is necessary beneath the car body in order to obtain effective streamlining, the car has a rounded belly formed by bars 50 which join the side sills 49 to the lower portion of the center sill, these bars being reinforced by struts 51 and 52.

At the front, the box girder 39 is modified to the extent that it becomes a trough having apertured sides 53 and 54, so that air taken in through openings 55 in the nose of the car may circulate around the engine 20, over cooling radiators 56 mounted just below the roof in the engine room, and through the openings in the sides 53 and 54 to the outside atmosphere. The trough also provides a convenient place for mounting the engine muffler 57.

The nose of the car is of exceptionally sturdy construction and comprises a coupler casting 58 to which the forward ends of the side sills 49 are attached (see Fig. 4) and to which a ridge beam 59, buff sills 60 and 61, diagonal braces 62 and 63, and floor channels 64 are also attached.

Reinforcing plates 65 (one on each side of the ridge beam) extend between the ridge beam 59 and the buff sills 60 and 61, and a plurality of vertical ribs 66 join the ridge beam to the curved framing members at the forward end of the car.

The cab structure comprises an upper angle 67 and a lower channel 68 which connect with one of the ribs 44 and are spaced apart by spacers 69. Carlines 70 and 71 join the angle 67 with the sides 53 and 54 of the trough and with risers 72 and 73 which with a transverse member 74 define the rear wall of the operator's cab.

There are other framing members which constitute a part of the body but it is unimportant for them to be described here.

The box frame 30 which receives the power unit has its sides 32 and 33 joined to the side framing members of the car body by a plurality of bars 75, the cross ties 29 and 31, and body bolster extension castings 76, the latter having a portion 77 which frames into the side channel 64, as shown in Fig. 5, and another portion 78 which engages the side sill 49.

The engine bed 24 which is best shown in its assembled relation in Fig. 4, comprises end castings 85 and 86, an intermediate casting or body bolster 87, and longitudinal side frames 88, the latter being generally of inverted Y-shape and including a box girder portion generally designated 89, surmounted by a relatively deep vertical web 90 having an enlarged head 91.

The engine bed framing members, as well as those constituting the car body, are preferably of aluminum alloy formed by the extrusion process where practical, and otherwise cast. In some cases, however, steel castings are used in the body framework where exceptional strength is required.

Due to limitations of manufacturing practice, the side frames 88 are made up of a plurality of sections which include a top beam section 92, an inverted channel section 93 of irregular shape, a vertical gusset section 94, a body attaching section 95, and a Z-bar section 96. The several sections are interlocked with one another by tongue and groove joints, with a line of rivets along each joint, as shown in Figs. 7–10 inclusive. The tongue and groove joints take substantially all of the shear between the parts and the rivets merely hold the parts together.

The end castings 85 and 86 and the body bolster 87 are stepped, as best shown in Figs. 6, 8, 9, and 10, to conform with the shape of the side frames 88, and particularly the body attaching section 95. This latter section has inclined webs 97 and 98 and horizontal webs 99 and 100, the two latter being provided with openings 101 which aline with openings 102 in the correspondingly shaped sides of the box frame 30 so that the engine bed may be secured in operative position, as shown in Fig. 5, by bolts 103.

The end castings 85 and 86 have their outer walls shaped to conform with the inside walls of the cross ties 31 and 29, respectively, (Fig. 8) and bolts 104 secure the end castings to the car body.

It will thus be seen that the entire power unit may be removed from the car body by merely removing the bolts 103 and 104, and by disconnecting the water, fuel and exhaust pipes, etc. from the engine.

The motors 22 are cooled by a draft of air forced downwardly through flexible ducts 105 which are secured to the engine bed on opposite sides of the body bolster 87, one duct serving each of the two motors. The air used for cooling is drawn through the end of the box girders 89 and through openings 106 in the engine bed side frames (Figs. 4 and 4-a), and the air is conducted through the hollow side frames to the ducts 105 where it passes to the motors, the lower portion of the side frame being closed by a plate 107 to enable the side frames to serve as horizontal ducts. The openings 108 (Fig. 10) in the motor casings are equipped with fans, not shown, to draw the air into the motors, and the connection with the ducts is such that relative movement between the car body and the truck is accommodated.

There are several types of load which influence the shape of the side frame members 88 of the engine bed. They are: The static load of the engine and the car body; the dynamic load of the engine as the car travels over rail joints; the dynamic load produced by operation of the engine; the side forces transmitted between the car body and the truck; and the enormous longitudinal stresses caused by collision. The first two of these loads merely requires a beam of adequate strength and this is furnished in the present embodiment of the invention by the beam section 92 supplemented by the other sections.

Inasmuch as the engine 20 is a multi-cylindered V-type engine, there will be forces directed along the axes of the cylinders. These forces are effectively resisted by the arms of the inverted Y which diverge at approximately the same angle as the two banks of cylinders.

Since the control cab of the car is located forward of the engine, the engine bed must act as a column in the event of collision if protection is to be afforded to the personnel in the cab. This is accomplished in the illustrative embodiment of the invention by the inverted Y-shaped section of the side framing members and more particularly by the box girder construction which is afforded by the arms of the Y, the vertical wall 105 of the box section 93, and the vertical gusset section 94. Thus, in the event of collision, the inertia of the engine is transmitted through the engine bed side frame members to the front cross tie 31 and thence through the buff sills 60 and 61, the diagonal braces 62 and 63, and other car body framing members to the nose of the car, the particular framing members which are mentioned being of sufficient cross section to withstand this type of stress.

Obviously, the cross sectional shape of the engine bed may be altered in certain details without departing from the spirit of the invention, and, unless prohibited by the prior art, such modifications are included within the scope of this invention.

What I claim is:—

1. An engine bed for rail cars, the side members of which include an inverted Y-section having vertical gusset webs depending from the arms of the Y, one of said arms having a plurality of offset portions having grooves on the upper surface thereof for receiving tongues on the body frame of the car.

2. In an engine bed for rail cars, a side framing member having beam and column characteristics and comprising a box girder having a relatively deep vertical web surmounting the top wall of the girder.

3. In an engine bed for rail cars, a side framing member having beam and column characteristics and comprising a box girder having a relatively deep vertical web surmounting the top wall of the girder, said web having an enlarged head.

4. For use with an internal combustion engine of the type in which a bank of cylinders is inclined with respect to another bank of cylinders, an engine bed having side framing members which include an inverted Y-section, the arms of which are inclined at an angle corresponding approximately to the angle between the banks of cylinders, and vertical gusset webs extending downwardly from the arms of the Y, said arms and gussets having tongue and groove connections, and means for holding tongues and grooves in interlocking connection.

5. An engine bed having its side framing members of inverted Y-shaped section, each being formed of a plurality of extruded metal shapes having interlocking tongue and groove joints.

6. An engine bed for rail cars comprising longitudinal side frames, end members connecting the ends of said side frames, a body bolster connecting intermediate portions of said side frames, each of said side frames comprising a sectional inverted Y-shaped member in cross section, said sections having tongue and groove connections extending longitudinally of the frame.

7. In an engine supporting bed for motor cars, a side framing member comprising a box girder and a beam surmounting the box girder, said beam comprising a web having flanges on its lower edge portion extending laterally, said flanges forming an obtuse angle and resting on said box section, and means including tongue and groove connection for rigidly connecting said flanges to said girder.

8. In a car provided with a V-type internal combustion engine for propelling the same, an engine bed having inverted Y-sections for supporting said engine, one arm of said Y-section at each side of said engine and bed being substantially in the plane of the axes of the pistons at the opposite side of said engine, whereby the reaction of the power stroke will be in the plane of said arm and resisted thereby.

9. In a car provided with an internal combustion engine having cylinders arranged at an angle to each other, said cylinders extending at acute angles to the horizontal, an engine bed for supporting said engine, said bed having side bars having web portions extending lengthwise the engine substantially in the planes of the axes of said cylinders for edgewisely resisting the reaction of the explosive forces of said cylinders.

MARTIN P. BLOMBERG.